United States Patent
Shi

(10) Patent No.: US 11,796,769 B2
(45) Date of Patent: Oct. 24, 2023

(54) CAMERA OPTICAL LENS

(71) Applicant: AAC Optics (Changzhou) Co., Ltd., Changzhou (CN)

(72) Inventor: Rongbao Shi, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 425 days.

(21) Appl. No.: 17/134,208

(22) Filed: Dec. 25, 2020

(65) Prior Publication Data

US 2021/0373291 A1 Dec. 2, 2021

(30) Foreign Application Priority Data

May 26, 2020 (CN) .......................... 202010451294.5

(51) Int. Cl.
*G02B 9/60* (2006.01)
*G02B 13/00* (2006.01)
(Continued)

(52) U.S. Cl.
CPC ........... *G02B 13/0045* (2013.01); *G02B 9/60* (2013.01); *G02B 13/04* (2013.01); *G02B 13/06* (2013.01)

(58) Field of Classification Search
CPC ......... G02B 9/60; G02B 13/01; G02B 13/04; G02B 13/06; G02B 13/18; G02B 13/005;
(Continued)

(56) References Cited

U.S. PATENT DOCUMENTS

| 2013/0021680 A1* | 1/2013 | Chen | ................. | G02B 13/0045 |
| | | | | 359/714 |
| 2015/0168695 A1* | 6/2015 | Tsai | ........................ | G02B 9/60 |
| | | | | 348/360 |

(Continued)

FOREIGN PATENT DOCUMENTS

CN 110850563 A * 2/2020 ......... G02B 13/0045

OTHER PUBLICATIONS

Simon Thibault et al., Consumer Electronic Optics: How Small a Lens can be? The Case of Panomorph Lenses, 9192 Proeceedings of SPIE 91920H-1 to 91920H-7 (2014). (Year: 2014).*

(Continued)

*Primary Examiner* — Jade R Chwasz
*Assistant Examiner* — Wesley Scott Ashton
(74) *Attorney, Agent, or Firm* — W&G Law Group

(57) ABSTRACT

A camera optical lens includes first to fifth lenses that are sequentially arranged from an object side to an image side. Each of the first lens, the third lens, and the fourth lens has a positive refractive power, and each of the second lens and the fifth lens has a negative refractive power. The camera optical lens satisfies: $0.50 \leq f1/f \leq 0.80$; $-1.20 \leq f2/f \leq -0.70$; $1.50 \leq d8/d9 \leq 3.00$; $-1.50 \leq R3/R4 \leq -0.60$; and $1.20 \leq R7/R8 \leq 2.00$, where f denotes a focal length of the camera optical lens; f1 denotes a focal length of the first lens; f2 denotes a focal length of the second lens; and d8 denotes an on-axis distance from an image-side surface of the fourth lens to an object-side surface of the fifth lens. The camera optical lens can achieve high optical performance while satisfying design requirements for being ultra-thin and having a wide-angle and a large aperture.

9 Claims, 7 Drawing Sheets

(51) Int. Cl.
*G02B 13/04* (2006.01)
*G02B 13/06* (2006.01)

(58) Field of Classification Search
CPC ............ G02B 13/0015; G02B 13/0045; G02B 15/28; G02B 15/145113; G02B 27/0013; G02B 27/0025
See application file for complete search history.

(56) References Cited

U.S. PATENT DOCUMENTS

| | | | | |
|---|---|---|---|---|
| 2016/0223792 A1* | 8/2016 | Tang | ................... | G02B 13/0045 |
| 2018/0188491 A1* | 7/2018 | Chang | ................ | G02B 13/0045 |
| 2018/0188492 A1* | 7/2018 | Chang | ................ | G02B 13/0045 |
| 2019/0064484 A1* | 2/2019 | Yeh | ........................... | G02B 9/60 |
| 2021/0263279 A1* | 8/2021 | Wang | ................. | G02B 27/0025 |
| 2021/0382276 A1* | 12/2021 | Peng | ........................ | G02B 9/60 |
| 2022/0066135 A1* | 3/2022 | Sun | ..................... | G02B 27/0025 |
| 2022/0066158 A1* | 3/2022 | Li | .......................... | G02B 13/18 |
| 2022/0229271 A1* | 7/2022 | Tseng | ................. | G02B 13/0065 |

OTHER PUBLICATIONS

Focal Lengths, Apertures and F/Numbers, (2016), pp. 1-2 [online], [retrieved Apr. 17, 2023], retrieved from the Internet <URL: https://web.archive.org/web/20161224073515/https://spacemath.gsfc.nasa.gov/weekly/10Page30.pdf>. (Year: 2016).*

The F-word in Optics, 2018, pp. 1-4 [online], [retrieved Apr. 17, 2023], retrieved from the Internet <URL: https://wp.optics.arizona.edu/jpalmer/wp-content/uploads/sites/65/2018/11/f_word.pdf>. (Year: 2018).*

Ji-yan Zhang et al., Design of 10 Mega-pixel Mobile Phone Lens, Third International Conference on Instrumentation, Measurement, Computer, Communication and Control 569-573 (2013). (Year: 2013).*

* cited by examiner

CAMERA OPTICAL LENS

TECHNICAL FIELD

The present disclosure relates to the field of optical lens, and more particularly, to a camera optical lens suitable for handheld terminal devices such as smart phones or digital cameras and suitable for camera devices such as monitors or PC lenses.

BACKGROUND

With the development of camera technology, camera optical lenses are widely used in various electronic products, such as smart phones and digital cameras. In order to facilitate portability, people are increasingly pursuing thinner and lighter electronic products, miniature camera lenses with good imaging quality therefore have become a mainstream in the market.

In order to obtain better imaging quality, the lens that is traditionally equipped in mobile phone cameras adopts a three-piece or four-piece lens structure. However, with the development of technology and the increase of the diverse demands of users, and as the pixel area of photosensitive devices is becoming smaller and smaller and the requirement of the system on the imaging quality is improving constantly, a five-piece lens structure gradually appears in lens designs. Although the common five-piece lens has good optical performance, its settings on refractive power, lens spacing and lens shape still have some irrationality, which results in that the lens structure cannot achieve a high optical performance while satisfying design requirements for ultra-thin and long-focal-length lenses.

Therefore, it is necessary to provide a camera optical lens that has good optical performance and satisfies the requirements for ultra-thin, long-focal-length, and large-aperture design.

SUMMARY

In view of the problems, the present disclosure aims to provide a camera optical lens, which can solve a problem that traditional camera optical lenses cannot fully achieve ultra-thin, large-aperture, and long-focal-length performance.

A camera optical lens includes a first lens, a second lens, a third lens, a fourth lens, and a fifth lens that are sequentially arranged from an object side to an image side. Each of the first lens, the third lens, and the fourth lens has a positive refractive power, and each of the second lens and the fifth lens has a negative refractive power. The camera optical lens satisfies: $0.50 \leq f1/f \leq 0.80$; $-1.20 \leq f2/f \leq 0.70$; $1.50 \leq d8/d9 \leq 3.00$; $-1.50 \leq R3/R4 \leq -0.60$; and $1.20 \leq R7/R8 \leq 2.00$, where f denotes a focal length of the camera optical lens; f1 denotes a focal length of the first lens; f2 denotes a focal length of the second lens; d8 denotes an on-axis distance from an image-side surface of the fourth lens to an object-side surface of the fifth lens; d9 denotes an on-axis thickness of the fifth lens; R3 denotes a curvature radius of an object-side surface of the second lens; R4 denotes a curvature radius of an image-side surface of the second lens; R7 denotes a curvature radius of an object-side surface of the fourth lens; and R8 denotes a curvature radius of the image-side surface of the fourth lens.

As an improvement, the camera optical lens further satisfies: $1.50 \leq d4/d6 \leq 3.00$, where d4 denotes an on-axis distance from the image-side surface of the second lens to an object-side surface of the third lens, and d6 denotes an on-axis distance from an image-side surface of the third lens to the object-side surface of the fourth lens.

As an improvement, the camera optical lens further satisfies: $-2.55 \leq (R1+R2)/(R1-R2) \leq -0.24$ and $0.06 \leq d1/TTL \leq 0.29$, where R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image plane of the camera optical lens along an optic axis.

As an improvement, the camera optical lens further satisfies: $-0.46 \leq (R3+R4)/(R3-R4) \leq 0.30$ and $0.02 \leq d3/TTL \leq 0.09$, where d3 denotes an on-axis thickness of the second lens, and TTL denotes a total optical length from an object-side surface of the first lens to an image plane of the camera optical lens along an optic axis.

As an improvement, the camera optical lens further satisfies: $1.56 \leq f3/f \leq 6.08$, $-3.02 \leq (R5+R6)/(R5-R6) \leq 0.48$, and $0.03 \leq d5/TTL \leq 0.10$, where f3 denotes a focal length of the third lens, R5 denotes a curvature radius of an object-side surface of the third lens, R6 denotes a curvature radius of an image-side surface of the third lens, d5 denotes an on-axis thickness of the third lens, and TTL denotes a total optical length from an object-side surface of the first lens to an image plane of the camera optical lens along an optic axis.

As an improvement, the camera optical lens further satisfies: $0.88 \leq f4/f \leq 3.89$, $1.61 \leq (R7+R8)/(R7-R8) \leq 12.61$, and $0.03 \leq d7/TTL \leq 0.14$, where f4 denotes a focal length of the fourth lens, d7 denotes an on-axis thickness of the fourth lens, and TTL denotes a total optical length from an object-side surface of the first lens to an image plane of the camera optical lens along an optic axis.

As an improvement, the camera optical lens further satisfies: $-2.15 \leq f5/f \leq -0.59$, $0.69 \leq (R9+R10)/(R9-R10) \leq 3.77$, and $0.04 \leq d9/TTL \leq 0.17$, where f5 denotes a focal length of the fifth lens, R9 denotes a curvature radius of the object-side surface of the fifth lens, R10 denotes a curvature radius of an image-side surface of the fifth lens, and TTL denotes a total optical length from an object-side surface of the first lens to an image plane of the camera optical lens along an optic axis.

As an improvement, the camera optical lens further satisfies: $FNO \leq 2.20$, where FNO denotes an F number of the camera optical lens.

As an improvement, the camera optical lens further satisfies: $f/IH \geq 1.63$, where IH denotes an image height of the camera optical lens.

As an improvement, the camera optical lens further satisfies: $TTL/IH \leq 1.85$, where IH denotes an image height of the camera optical lens, and TTL denotes a total optical length from an object-side surface of the first lens to an image plane of the camera optical lens along an optic axis.

The camera optical lens according to the present disclosure achieves high optical performance while satisfying design requirements for ultra-thin, long-focal-length lenses having large apertures, and suitable for camera lens assembly of mobile phones and WEB camera lenses formed by imaging elements for high pixels, such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments.

To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
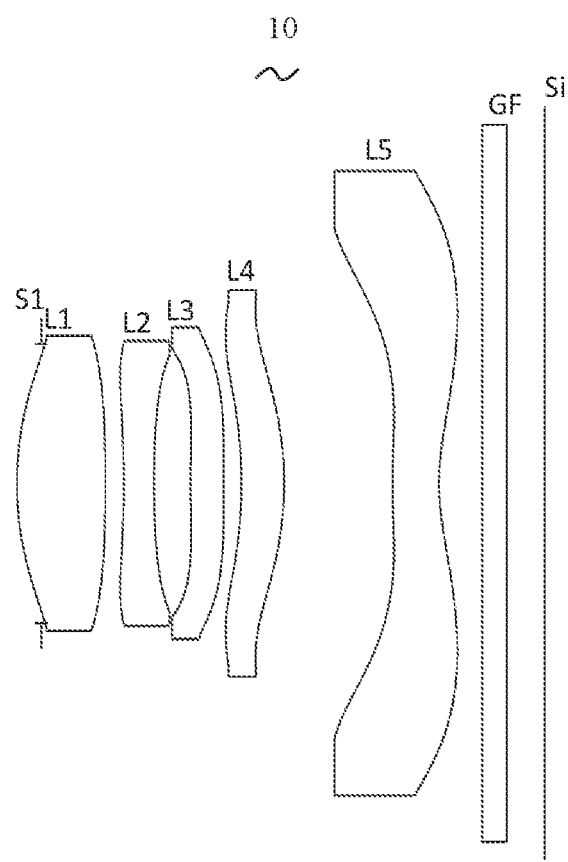
FIG. 1 is a schematic diagram of a structure of a camera optical lens in accordance with Embodiment 1 of the present disclosure.

Referring to FIG. 1 to FIG. 4, the present disclosure provides a camera optical lens 10 in Embodiment 1. In FIG. 1, a left side is an object side, and a right side is an image side. The camera optical lens 10 mainly includes an aperture S1, a first lens L1, a second lens L2, a third lens L3, a fourth lens L4, and a fifth lens L5 that are sequentially arranged from an object side to an image side. A glass filter (GF) is arranged between the fifth lens L5 and an image plane Si, and the glass filter (GF) can be a glass plate or can be an optical filter.

The first lens L1 is made of a plastic material, the second lens L2 is made of a plastic material, the third lens L3 is made of a plastic material, the fourth lens L4 is made of a plastic material, and the fifth lens L5 is made of a plastic material.

Herein, a focal length of the camera optical lens 10 is defined as f, a focal length of the first lens L1 is defined as f1, a focal length of the second lens L2 is defined as f2, a curvature radius of an object-side surface of the second lens L2 is defined as R3, a curvature radius of an image-side surface of the second lens L2 is defined as R4, a curvature radius of an object-side surface of the fourth lens L4 is defined as R7, a curvature radius of an image-side surface of the fourth lens L4 is defined as R8, an on-axis distance from the image-side surface of the fourth lens L4 to an object-side surface of the fifth lens L5 is defined as d8, and an on-axis thickness of the fifth lens L5 is defined as d9. The camera optical lens 10 satisfies:

$$0.50 \leq f1/f \leq 0.80 \tag{1}$$

$$-1.20 \leq f2/f \leq -0.70 \tag{2}$$

$$1.50 \leq d8/d9 \leq 3.00 \tag{3}$$

$$-1.50 \leq R3/R4 \leq -0.60 \tag{4; and}$$

$$1.20 \leq R7/R8 \leq 2.00 \tag{5},$$

where the condition (1) specifies a ratio of the focal length of the first lens to the focal length of the camera optical lens. With the condition, imaging quality can be improved.

The condition (2) specifies a ratio of the focal length of the second lens to the total focal length of the camera optical lens. With the condition, the performance of the optical system can be improved.

The condition (3), when d8/d9 satisfies the condition, it is beneficial to correct field curvature and improve the imaging quality.

The condition (4) specifies a shape of the second lens L2. This condition facilitates to correct spherical aberration and improve system performance.

The condition (5) specifies a shape of the fourth lens L4. This condition can alleviate deflection of light passing through the lens while effectively reducing aberrations. As an example, $1.24 \leq R7/R8 \leq 1.95$.

As an example, an on-axis distance from the image-side surface of the second lens L2 to an object-side surface of the third lens L3 is d4, an on-axis distance from an image-side surface of the third lens L3 to the object-side surface of the fourth lens L4 is d6, and the camera optical lens 10 satisfies a condition of $1.50 \leq d4/d6 \leq 3.00$. When d4/d6 satisfies the condition, a position of the third lens L3 can be effectively configured, which is beneficial for lens assembling.

The first lens L1 has a positive refractive power, includes an object-side surface being convex in a paraxial region and an image-side surface being convex in the paraxial region.

As an example, a curvature radius of the object-side surface of the first lens L1 is defined as R1, a curvature radius of the image-side surface of the first lens L1 is defined as R2, and the camera optical lens 10 satisfies a condition of $-2.55 \leq (R1+R2)/(R1-R2) \leq -0.24$. This can reasonably control a shape of the first lens L1, so that the first lens L1 can effectively correct spherical aberrations of the system. As an example, $-1.59 \leq (R1+R2)/(R1-R2) \leq 0.30$.

As an example, an on-axis thickness of the first lens L1 is defined as d1, the total optical length from the object-side surface of the first lens L1 to an image plane of the camera optical lens along an optic axis is defined as TTL, and the camera optical lens 10 satisfies a condition of $0.06 \leq d1/TTL \leq 0.29$. This condition can facilitate achieving ultra-thin lenses. As an example, $0.10 \leq d1/TTL \leq 0.23$.

In this embodiment, the second lens L2 has a negative refractive power, includes the object-side surface being concave in a paraxial region and the image-side surface being concave in the paraxial region.

As an example, a curvature radius of the object-side surface of the second lens L2 is defined as R3, and a curvature radius of the image-side surface of the second lens L2 is defined as R4, and the camera optical lens 10 satisfies a condition of $-0.46 \leq (R3+R4)/(R3-R4) \leq 0.30$, which specifies a shape of the second lens L2. This can facilitate correction of an on-axis aberration. As an example, $-0.29 \leq (R3+R4)/(R3-R4) \leq 0.24$.

As an example, an on-axis thickness of the second lens L2 is defined as d3, the total optical length from the object-side surface of the first lens L1 to an image plane of the camera optical lens 10 along an optic axis is defined as TTL, and the camera optical lens 10 satisfies a condition of $0.02 \leq d3/TTL \leq 0.09$. This can facilitate achieving ultra-thin lenses. As an example, $0.03 \leq d3/TTL \leq 0.07$.

The third lens L3 has a positive refractive power, includes the object-side surface being convex in a paraxial region and the image-side surface being concave in the paraxial region.

As an example, the focal length of the camera optical lens 10 is f, a focal length of the third lens L3 is f3, and the camera optical lens 10 satisfies a condition of $1.56 \leq f3/f \leq 6.08$. The appropriate distribution of the refractive power leads to better imaging quality and a lower sensitivity of the system. As an example, $2.50 \leq f3/f \leq 4.86$.

As an example, a curvature radius of the object-side surface of the third lens L3 is defined as R5, a curvature radius of the image-side surface of the third lens L3 is defined as R6, and the camera optical lens 10 satisfies a condition of $-3.02 \leq (R5+R6)/(R5-R6) \leq 0.48$, which specifies a shape of the third lens. This condition can alleviate the deflection degree of light passing through the lens while effectively reducing aberrations. As an example, $-1.89 \leq (R5+R6)/(R5-R6) \leq 0.60$.

As an example, an on-axis thickness of the third lens L3 is defined as d5, the total optical length from the object-side surface of the first lens L1 to an image plane of the camera optical lens 10 along an optic axis is defined as TTL, and the camera optical lens 10 satisfies a condition of $0.03 \leq d5/TTL \leq 0.10$. This can facilitate achieving ultra-thin lenses. As an example, $0.05 \leq d5/TTL \leq 0.08$.

The fourth lens L4 has a positive refractive power, includes an object-side surface being concave in a paraxial region and an image-side surface being convex in the paraxial region.

As an example, a focal length of the fourth lens L4 is f4, the focal length of the camera optical lens 10 is f, and the camera optical lens 10 satisfies a condition of $0.88 \leq f4/f \leq 3.89$, which specifies a ratio of the focal length f4 of the fourth lens L4 to the focal length of the system. This condition can improve the performance of the optical system. As an example, $1.41 \leq f4/f \leq 3.12$.

As an example, a curvature radius of the object-side surface of the fourth lens L4 is defined as R7, a curvature radius of the image-side surface of the fourth lens L4 is defined as R8, and the camera optical lens 10 satisfies a condition of $1.61 \leq (R7+R8)/(R7-R8) \leq 12.61$, which specifies a shape of the fourth lens L4. This can facilitate correction of an off-axis aberration. As an example, $2.58 \leq (R7+R8)/(R7-R8) \leq 10.09$.

As an example, an on-axis thickness of the fourth lens L4 is defined as d7, the total optical length from the object-side surface of the first lens L1 to an image plane of the camera optical lens 10 along an optic axis is defined as TTL, and the camera optical lens 10 satisfies a condition of $0.03 \leq d7/TTL \leq 0.14$, which can facilitate achieving ultra-thin lenses. As an example, $0.05 \leq d7/TTL \leq 0.11$.

The fifth lens L5 has a negative refractive power, includes an object-side surface being convex in a paraxial region and an image-side surface being concave in the paraxial region.

As an example, a focal length of the fifth lens L5 is f5, the focal length of the camera optical lens 10 is f, and the camera optical lens 10 satisfies a condition of $-2.15 \leq f5/f \leq -0.59$. Limitations on the fifth lens L5 can effectively make a light angle of the camera optical lens 10 gentle and reduce the tolerance sensitivity. As an example, $-1.34 \leq f5/f \leq -0.74$.

As an example, a curvature radius of the object-side surface of the fifth lens L5 is defined as R9, a curvature radius of the image-side surface of the fifth lens L5 is defined as R10, and the camera optical lens 10 satisfies a condition of $0.69 \leq (R9+R10)/(R9-R10) \leq 3.77$, which specifies a shape of the fifth lens L5. This can facilitate correction of an off-axis aberration. As an example, $1.10 \leq (R9+R10)/(R9-R10) \leq 3.01$.

As an example, an on-axis thickness of the fifth lens L5 is defined as d9, the total optical length from the object-side surface of the first lens L1 to an image plane of the camera optical lens 10 along an optic axis is defined as TTL, and the camera optical lens 10 satisfies a condition of $0.04 \leq d9/TTL \leq 0.17$. This can facilitate achieving ultra-thin lenses. As an example, $0.07 \leq d9/TTL \leq 0.14$.

As an example, an F number (FNO) of the camera optical lens 10 is smaller than or equal to 2.20, thereby achieving a large aperture.

As an example, the focal length of the camera optical lens 10 is defined as f, an image height of the camera optical lens 10 is defined as IH, and the camera optical lens 10 satisfies a condition of $f/IH \geq 1.63$, thereby achieving a long focal length.

As an example, the total optical length from the object-side surface of the first lens L1 to an image plane of the camera optical lens 10 along an optic axis is defined as TTL, the image height of the camera optical lens 10 is defined as IH, and the camera optical lens 10 satisfies a condition of $TTL/IH \leq 1.85$, thereby achieving ultra-thin lenses. Specifically, compared with a long-focal-length lens in the related art, the total optical length is obviously shorter.

In addition, in the camera optical lens 10 provided by this embodiment, the surface of each lens can be set as an aspherical surface, and it is easy for the aspherical surface to be made into a shape other than a spherical surface, to obtain more control variables, for reducing aberrations, thereby reducing the number of lenses used, so that the total length of the camera optical lens 10 can be effectively reduced. In this embodiment, both the object-side surface and the image-side surface of each lens are all aspherical surfaces.

Since the first lens L1, the second lens L2, the third lens L3, the fourth lens L4, and the fifth lens L5 have the same structure and parameter relationship as above, the camera optical lens 10 can reasonably allocate the refractive power, spacing and shape of each lens, and thus various aberrations are corrected.

Thus, the camera optical lens 10 can satisfy design requirements for ultra-thin, long-focal-length lenses having large apertures while achieving good optical performance.

In the following, examples will be used to describe the camera optical lens 10 of the present disclosure. The symbols recorded in each example will be described as follows. The focal length, the on-axis distance, the curvature radius, the on-axis thickness, the inflexion point position, and the arrest point position are all in units of mm.

TTL: Optical length (the total optical length from the object-side surface of the first lens L1 to the image plane of the camera optical lens along the optic axis), in a unit of mm.

F number (FNO): a ratio of an effective focal length of the camera optical lens to an entrance pupil diameter of the camera optical lens.

In addition, at least one of the object-side surface and the image-side surface of each lens can be provided with an inflection point and/or an arrest point to meet the requirements of high-quality imaging, and for specific implementation options, see below.

The design data of the camera optical lens 10 shown in FIG. 1 is shown below.

Table 1 lists the curvature radius of the object-side surface and the curvature radius R of the image-side surface of the first lens L1 to the fifth lens L5 constituting the camera optical lens 10 in the Embodiment 1 of the present invention, the on-axis thickness of each lens, the distance d between adjacent lenses, refractive index nd and abbe number vd. It should be noted that R and d are both in units of millimeter (mm).

TABLE 1

|     | R       | d      |     | nd     |    | vd    |
|-----|---------|--------|-----|--------|----|-------|
| S1  | ∞       | d0= −0.280 |     |        |    |       |
| R1  | 2.138   | d1= 1.008 | nd1 | 1.5444 | v1 | 55.82 |
| R2  | −12.262 | d2= 0.209 |     |        |    |       |
| R3  | −6.861  | d3= 0.343 | nd2 | 1.6610 | v2 | 20.53 |
| R4  | 6.070   | d4= 0.420 |     |        |    |       |
| R5  | 9.645   | d5= 0.374 | nd3 | 1.6610 | v3 | 20.53 |
| R6  | 69.977  | d6= 0.202 |     |        |    |       |
| R7  | −3.588  | d7= 0.487 | nd4 | 1.5444 | v4 | 55.82 |
| R8  | −2.334  | d8= 1.234 |     |        |    |       |
| R9  | 4.937   | d9= 0.530 | nd5 | 1.5236 | v5 | 55.69 |
| R10 | 1.678   | d10= 0.492 |     |        |    |       |
| R11 | ∞       | d11= 0.276 | ndg | 1.5168 | vg | 64.17 |
| R12 | ∞       | d12= 0.433 |     |        |    |       |

In the table, meanings of various symbols will be described as follows.

S1: aperture;
R: central curvature radius for a lens;
R1: curvature radius of the object-side surface of the first lens L1;
R2: curvature radius of the image-side surface of the first lens L1;
R3: curvature radius of the object-side surface of the second lens L2;
R4: curvature radius of the image-side surface of the second lens L2;
R5: curvature radius of the object-side surface of the third lens L3;
R6: curvature radius of the image-side surface of the third lens L3;
R7: curvature radius of the object-side surface of the fourth lens L4;
R8: curvature radius of the image-side surface of the fourth lens L4;
R9: curvature radius of the object-side surface of the fifth lens L5;
R10: curvature radius of the image-side surface of the fifth lens L5;
R11: curvature radius of an object-side surface of the optical filter GF;
R12: curvature radius of an image-side surface of the optical filter GF;
d: on-axis thickness of a lens and an on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the optical filter GF;
d11: on-axis thickness of the optical filter GF;
d12: on-axis distance from the image-side surface of the optical filter GF to the image plane;
nd: refractive index of d line (the d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

Table 2 shows aspherical data of respective lens in the camera optical lens 10 according to Embodiment 1 of the present disclosure.

TABLE 2

|    | Conic coefficient | Aspherical coefficients | | | | |
|----|-------------------|-------------|-------------|-------------|-------------|-------------|
|    | k                 | A4          | A6          | A8          | A10         | A12         |
| R1 | −7.2920E−02 | −8.2604E−03 | −8.0601E−03 | 6.2792E−03  | −1.2849E−02 | 9.5222E−03  |
| R2 | 4.1801E+01  | −3.9455E−02 | 3.0051E−02  | −1.8760E−02 | −7.2923E−03 | 1.3112E−02  |
| R3 | −6.7344E+01 | −4.7994E−02 | 1.4865E−01  | −1.3928E−01 | 6.6204E−02  | −3.9539E−03 |
| R4 | 2.3642E+01  | −3.9107E−02 | 1.3906E−01  | −1.4121E−01 | 7.8137E−02  | −2.3439E−02 |
| R5 | −3.9170E+01 | −1.3834E−01 | 2.8487E−02  | 1.1673E−03  | −7.3972E−02 | 8.0097E−02  |
| R6 | −5.9433E+01 | −1.3226E−01 | 3.4368E−02  | 2.1407E−02  | −7.7644E−02 | 8.6302E−02  |
| R7 | −1.6881E+01 | −1.0277E−01 | 7.9252E−02  | −1.9305E−02 | −8.1490E−03 | 8.3639E−04  |
| R8 | −9.1450E−01 | −2.5631E−02 | 3.7692E−02  | −1.1600E−02 | 7.8985E−03  | −3.6712E−03 |

TABLE 2-continued

| | | | | | |
|---|---|---|---|---|---|
| R9 | −1.3490E+00 | −1.8733E−01 | 8.2442E−02 | −2.8028E−02 | 6.4218E−03 | −8.5241E−04 |
| R10 | −6.5270E+00 | −7.6671E−02 | 2.9945E−02 | −8.5314E−03 | 1.5158E−03 | −1.6248E−04 |

| | Conic coefficient | Aspherical coefficients | | |
|---|---|---|---|---|
| | k | A14 | A16 | A18 |
| R1 | −7.2920E−02 | −4.4923E−03 | 8.4881E−04 | 0.0000E+00 |
| R2 | 4.1801E+01 | −5.5542E−03 | 7.8630E−04 | 0.0000E+00 |
| R3 | −6.7344E+01 | −6.5629E−03 | 1.6769E−03 | 0.0000E+00 |
| R4 | 2.3642E+01 | 3.5221E−03 | −2.0698E−04 | 0.0000E+00 |
| R5 | −3.9170E+01 | −4.6951E−02 | 1.2873E−02 | 0.0000E+00 |
| R6 | −5.9433E+01 | −5.3502E−02 | 1.8444E−02 | −2.5811E−03 |
| R7 | −1.6881E+01 | 4.7866E−04 | −9.1617E−05 | 0.0000E+00 |
| R8 | −9.1450E−01 | 7.3678E−04 | −5.5631E−05 | 0.0000E+00 |
| R9 | −1.3490E+00 | 5.9708E−05 | −1.7381E−06 | 0.0000E+00 |
| R10 | −6.5270E+00 | 9.4705E−06 | −2.2044E−07 | 0.0000E+00 |

In Table 2, k is a conic coefficient, and A4, A6, A8, A10, A12, A14, A16, and A18 are aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18} \quad (6),$$

where x is a vertical distance between a point on an aspherical curve and the optic axis, and y is an aspherical depth (a vertical distance between a point on an aspherical surface, having a distance of x from the optic axis, and a surface tangent to a vertex of the aspherical surface on the optic axis).

For convenience, an aspherical surface of each lens surface uses the aspherical surfaces shown in the above condition (6). However, the present disclosure is not limited to the aspherical polynomial form shown in the condition (6).

Table 3 and Table 4 show design data of inflexion points and arrest points of respective lens in the camera optical lens 10 of this embodiment. P1R1 and P1R2 represent the object-side surface and the image-side surface of the first lens L1, respectively; P2R1 and P2R2 represent the object-side surface and the image-side surface of the second lens L2, respectively; P3R1 and P3R2 represent the object-side surface and the image-side surface of the third lens L3, respectively; P4R1 and P4R2 represent the object-side surface and the image-side surface of the fourth lens L4, respectively; and P5R1 and P5R2 represent the object-side surface and the image-side surface of the fifth lens L5, respectively. The data in the column "inflexion point position" refers to vertical distances from inflexion points arranged on each lens surface to the optic axis of the camera optical lens 10. The data in the column "arrest point position" refers to vertical distances from arrest points arranged on each lens surface to the optic axis of the camera optical lens 10.

TABLE 3

| | Number of inflexion points | Inflexion point position 1 | Inflexion point position 2 |
|---|---|---|---|
| P1R1 | 1 | 1.065 | / |
| P1R2 | 0 | / | / |
| P2R1 | 1 | 0.575 | / |
| P2R2 | 0 | / | / |
| P3R1 | 1 | 0.255 | / |
| P3R2 | 2 | 0.105 | 1.255 |
| P4R1 | 2 | 0.835 | 1.595 |
| P4R2 | 2 | 0.965 | 1.705 |
| P5R1 | 2 | 0.325 | 1.805 |
| P5R2 | 2 | 0.635 | 2.645 |

TABLE 4

| | Number of arrest points | Arrest point position 1 | Arrest point position 2 |
|---|---|---|---|
| P1R1 | 0 | / | / |
| P1R2 | 0 | / | / |
| P2R1 | 1 | 0.925 | / |
| P2R2 | 0 | / | / |
| P3R1 | 1 | 0.435 | / |
| P3R2 | 1 | 0.165 | / |
| P4R1 | 2 | 1.295 | 1.745 |
| P4R2 | 2 | 1.525 | 1.825 |
| P5R1 | 2 | 0.575 | 2.535 |
| P5R2 | 1 | 1.465 | / |

Table 13 below further lists various values of Embodiments 1, 2 and 3 and values corresponding to parameters which are specified in the above conditions.

As shown in Table 3, Embodiment 1 satisfies the various conditions.

Figure 2:
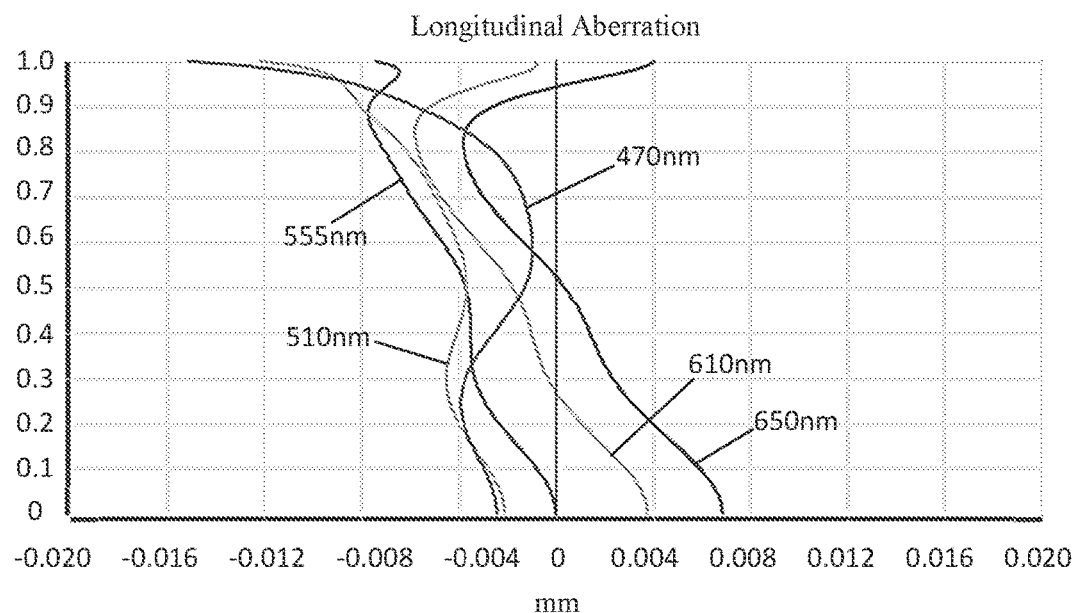
FIG. 2 is a schematic diagram of a longitudinal aberration of the camera optical lens shown in FIG. 1.
Figure 3:
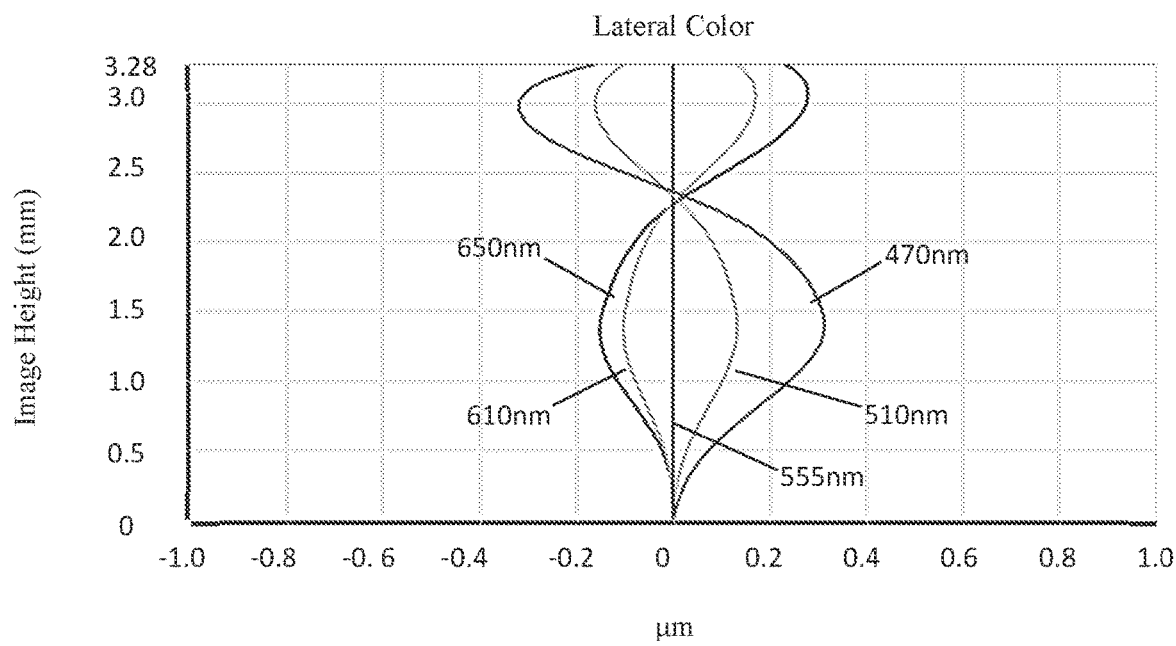
FIG. 3 is a schematic diagram of a lateral color of the camera optical lens shown in FIG. 1.
Figure 4:
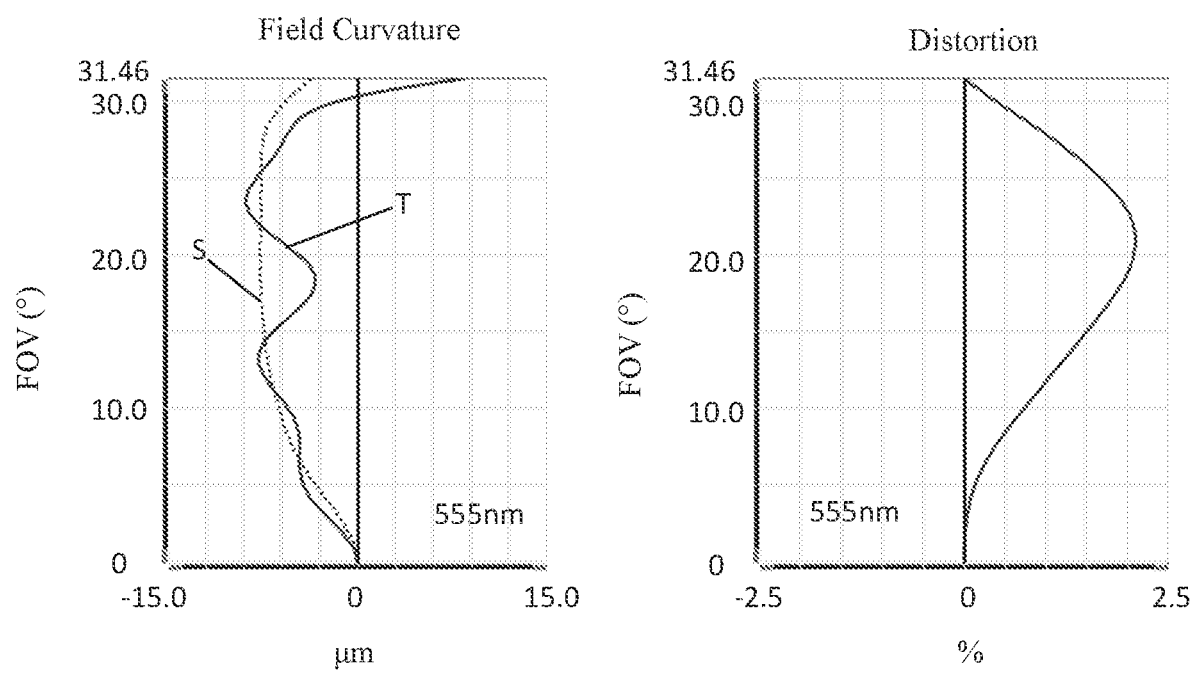
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm, 470 nm after passing the camera optical lens 10. FIG. 4 illustrates a field curvature and a distortion of light with a wavelength of 555 nm after passing the camera optical lens 10, in which a field curvature S is a field curvature in a sagittal direction and T is a field curvature in a tangential direction.

In this embodiment, the entrance pupil diameter ENPD of the camera optical lens 10 is 2.436 mm. The image height IH is 3.28 mm. The field of view (FOV) along a diagonal direction is 62.92°. Thus, the camera optical lens 10 can satisfy requirements of ultra-thin, large-aperture, long-focal-length design while having on-axis and off-axis aberrations sufficiently corrected, thereby leading to better optical characteristics.

Embodiment 2

Figure 5:
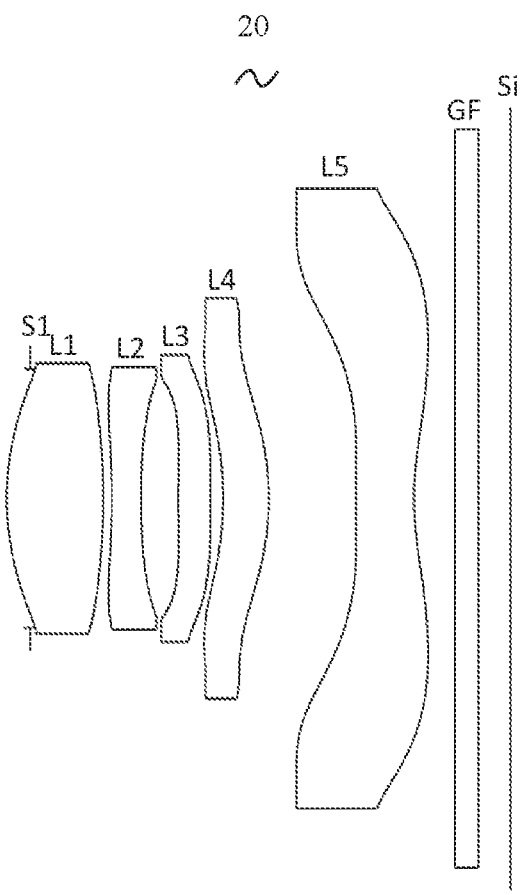
FIG. 5 is a schematic diagram of a structure of a camera optical lens in accordance with Embodiment 2 of the present disclosure.

FIG. 5 is a structural schematic diagram of the camera optical lens 20 in Embodiment 2. Embodiment 2 is basically the same as Embodiment 1 and involves symbols having the same meanings as Embodiment 1, and the same portions will not be repeated. Only differences therebetween will be described in the following.

In this embodiment, the image-side surface of the third lens L3 is convex in the paraxial region.

Table 5 and Table 6 show design data of a camera optical lens 20 in Embodiment 2 of the present disclosure.

TABLE 5

|    | R        | d      |     | nd     |     | vd    |
|----|----------|--------|-----|--------|-----|-------|
| S1 | ∞        | d0=    | −0.280 |        |     |       |
| R1 | 2.095    | d1=    | 1.150 | nd1    | 1.5444 | v1 | 55.82 |
| R2 | −4.488   | d2=    | 0.104 |        |     |       |
| R3 | −4.185   | d3=    | 0.348 | nd2    | 1.6610 | v2 | 20.53 |
| R4 | 6.660    | d4=    | 0.442 |        |     |       |
| R5 | 13.110   | d5=    | 0.383 | nd3    | 1.6610 | v3 | 20.53 |
| R6 | −80.359  | d6=    | 0.150 |        |     |       |
| R7 | −2.732   | d7=    | 0.545 | nd4    | 1.5444 | v4 | 55.82 |
| R8 | −2.151   | d8=    | 1.039 |        |     |       |
| R9 | 12.860   | d9=    | 0.688 | nd5    | 1.5236 | v5 | 55.69 |
| R10| 2.047    | d10=   | 0.492 |        |     |       |
| R11| ∞        | d11=   | 0.276 | ndg    | 1.5168 | vg | 64.17 |
| R12| ∞        | d12=   | 0.384 |        |     |       |

Table 6 shows aspherical data of respective lenses in the camera optical lens 20 according to Embodiment 2 of the present disclosure.

TABLE 6

| | Conic coefficient | Aspherical coefficients | | | | |
|---|---|---|---|---|---|---|
| | k | A4 | A6 | A8 | A10 | A12 |
| R1 | 7.5971E−03 | −8.4213E−03 | −3.5900E−03 | −3.3073E−03 | 1.4888E−03 | −2.0093E−03 |
| R2 | −1.0138E+01 | 4.1878E−02 | −5.7645E−02 | 4.0791E−02 | −4.1031E−02 | 3.0016E−02 |
| R3 | −2.1600E+01 | 1.0057E−01 | −8.9013E−02 | 9.5853E−02 | −9.6181E−02 | 7.0854E−02 |
| R4 | 2.8729E+01 | 5.4750E−02 | −2.8093E−02 | 1.2720E−02 | −4.4447E−02 | 9.7655E−04 |
| R5 | 1.5999E−01 | −1.1482E−01 | 7.1959E−04 | 1.6473E−02 | −1.1960E−01 | 1.4003E−01 |
| R6 | 9.0000E+01 | −1.3310E−01 | 3.1734E−02 | 5.3641E−02 | −1.4623E−01 | 1.5692E−01 |
| R7 | −2.1116E+01 | −1.9994E−01 | 2.1539E−01 | −8.6325E−02 | 2.0437E−02 | −6.9340E−03 |
| R8 | −1.1082E+00 | −2.8741E−02 | 4.8028E−02 | −3.8899E−03 | −7.2026E−03 | 3.5281E−03 |
| R9 | 2.3759E+01 | −1.6120E−01 | 8.1784E−02 | −3.2548E−02 | 8.1150E−03 | −1.0870E−03 |
| R10 | −9.6180E+00 | −5.9625E−02 | 2.3339E−02 | −6.8179E−03 | 1.2077E−03 | −1.2734E−04 |

| | Conic coefficient | Aspherical coefficients | | |
|---|---|---|---|---|
| | k | A14 | A16 | A18 |
| R1 | 7.5971E−03 | 4.8446E−04 | −4.2991E−05 | 0.0000E+00 |
| R2 | −1.0138E+01 | −1.1140E−02 | 1.5665E−03 | 0.0000E+00 |
| R3 | −2.1600E+01 | −2.6724E−02 | 4.0213E−03 | 0.0000E+00 |
| R4 | 2.8729E+01 | −1.1288E−04 | 5.1763E−06 | 0.0000E+00 |
| R5 | 1.5999E−01 | −8.1049E−02 | 2.0959E−02 | 0.0000E+00 |
| R6 | 9.0000E+01 | −9.1396E−02 | 2.8607E−02 | −3.5185E−03 |
| R7 | −2.1116E+01 | 2.5561E−03 | −3.7936E−04 | 0.0000E+00 |
| R8 | −1.1082E+00 | −7.1372E−04 | 5.2524E−05 | 0.0000E+00 |
| R9 | 2.3759E+01 | 7.0149E−05 | −1.6470E−06 | 0.0000E+00 |
| R10 | −9.6180E+00 | 7.2457E−06 | −1.6292E−07 | 0.0000E+00 |

Table 7 and Table 8 show design data of inflexion points and arrest points of respective lens in the camera optical lens 20.

TABLE 7

| | Number of inflexion points | Inflexion point position 1 | Inflexion point position 2 |
|---|---|---|---|
| P1R1 | 1 | 1.105 | / |
| P1R2 | 0 | / | / |
| P2R1 | 1 | 0.465 | / |
| P2R2 | 0 | / | / |
| P3R1 | 1 | 0.245 | / |
| P3R2 | 1 | 1.195 | / |
| P4R1 | 2 | 0.805 | 1.545 |
| P4R2 | 2 | 0.935 | 1.665 |
| P5R1 | 2 | 0.215 | 1.735 |
| P5R2 | 2 | 0.645 | 2.685 |

TABLE 8

| | Number of arrest points | Arrest point position 1 | Arrest point position 2 |
|---|---|---|---|
| P1R1 | 0 | / | / |
| P1R2 | 0 | / | / |
| P2R1 | 1 | 0.895 | / |
| P2R2 | 0 | / | / |
| P3R1 | 1 | 0.405 | / |
| P3R2 | 0 | / | / |
| P4R1 | 2 | 1.365 | 1.635 |
| P4R2 | 0 | / | / |
| P5R1 | 1 | 0.365 | / |
| P5R2 | 1 | 1.465 | / |

Table 13 below further lists various values of Embodiment 2 and values corresponding to parameters which are specified in the above conditions. Obviously, the camera optical lens of this embodiment satisfies the various conditions.

Figure 6:
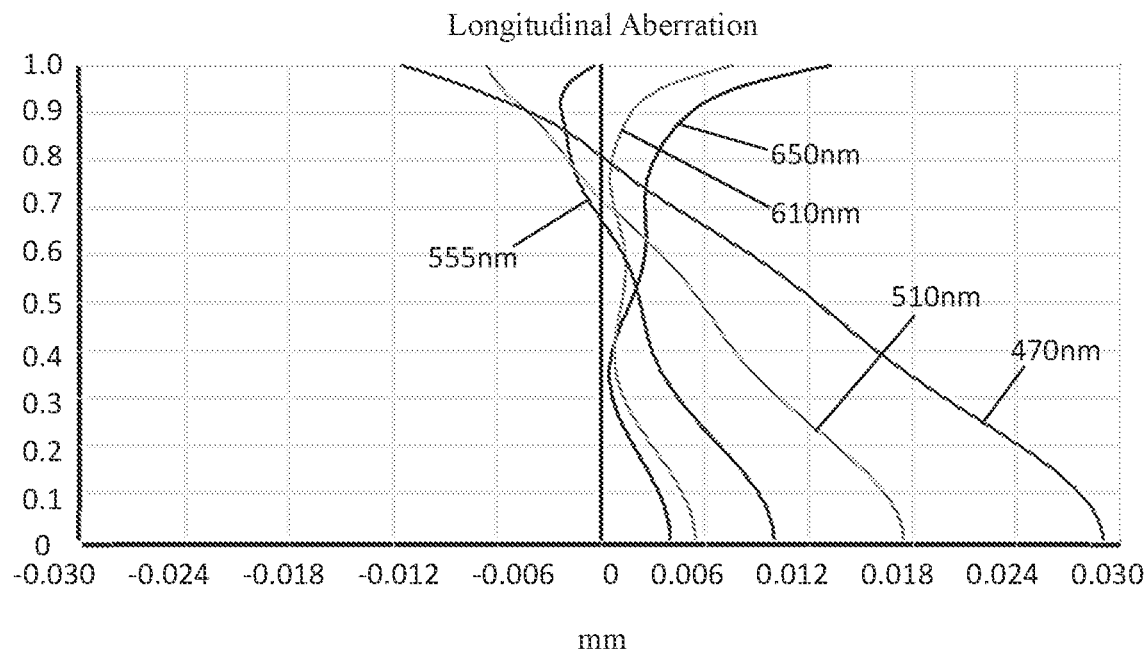
FIG. 6 is a schematic diagram of a longitudinal aberration of the camera optical lens shown in FIG. 5.
Figure 7:
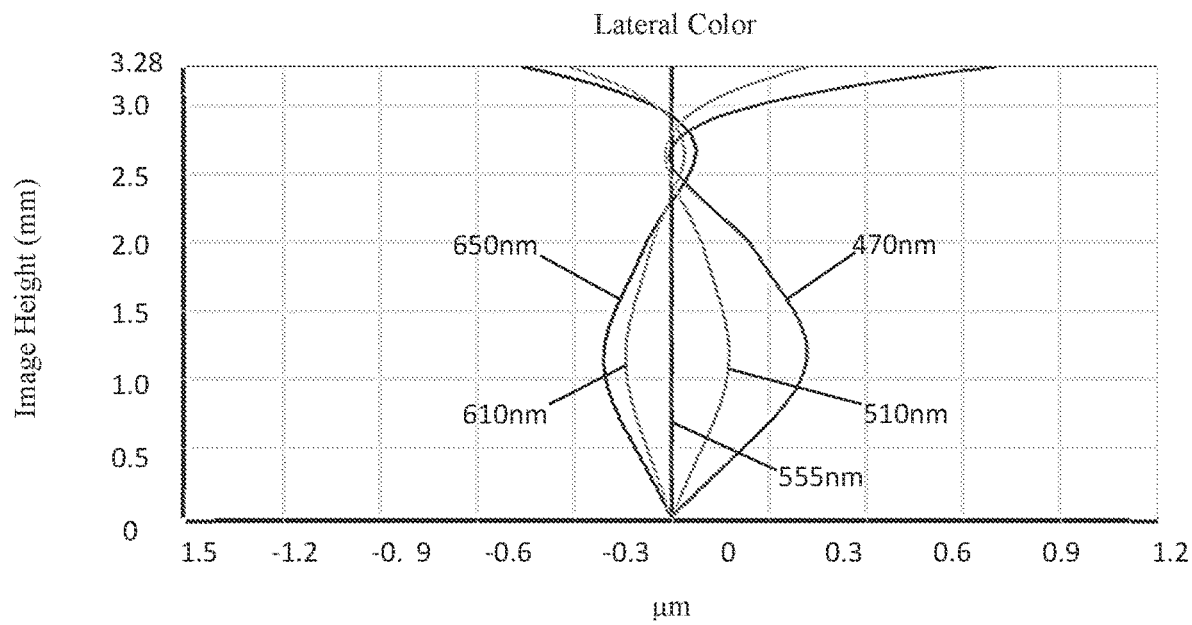
FIG. 7 is a schematic diagram of a lateral color of the camera optical lens shown in FIG. 5.
Figure 8:
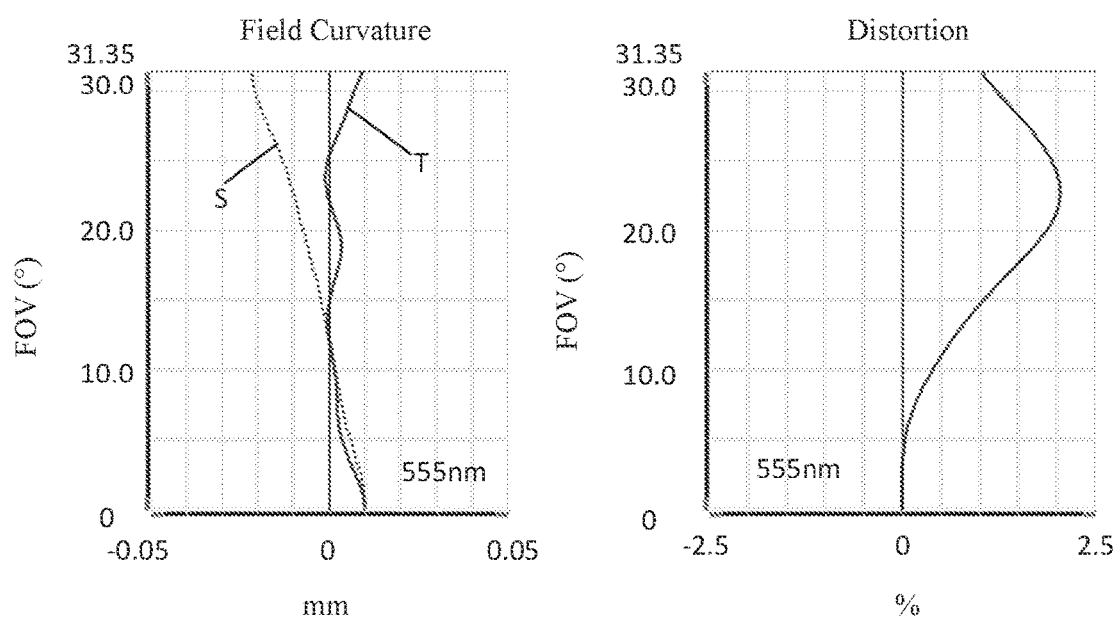
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, and 470 nm after passing the camera optical lens 20. FIG. 8 illustrates a field curvature and a distortion of light with a wavelength of 555 nm after passing the camera optical lens 20, in which a field curvature S is a field curvature in a sagittal direction and T is a field curvature in a tangential direction.

In this embodiment, the entrance pupil diameter ENPD of the camera optical lens 20 is 2.436 mm. The image height IH is 3.28 mm. The field of view (FOV) along a diagonal direction is 62.70°. Thus, the camera optical lens 20 can satisfy requirements of ultra-thin, large-aperture, long-focal-length design while having on-axis and off-axis aberrations sufficiently corrected, thereby leading to better optical characteristics.

Embodiment 3

Figure 9:
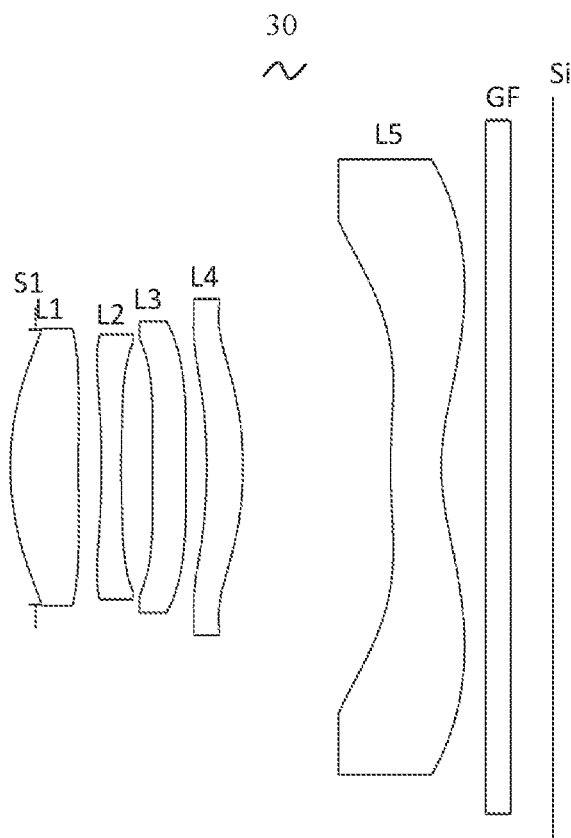
FIG. 9 is a schematic diagram of a structure of a camera optical lens in accordance with Embodiment 3 of the present disclosure.

FIG. 9 is a structural schematic diagram of the camera optical lens 30 in Embodiment 3. Embodiment 3 is basically the same as Embodiment 1 and involves symbols having the same meanings as Embodiment 1, and the same portions will not be repeated. Only differences therebetween will be described in the following.

In this embodiment, the image-side surface of the first lens L1 is concave in the paraxial region.

Table 9 and Table 10 show design data of a camera optical lens 30 in Embodiment 3 of the present disclosure.

TABLE 9

|  | R |  | d | nd | vd |
|---|---|---|---|---|---|
| S1 | ∞ | d0= | −0.280 |  |  |
| R1 | 2.045 | d1= | 0.753 | nd1 1.5444 | v1 55.82 |
| R2 | 17.011 | d2= | 0.253 |  |  |
| R3 | −10.686 | d3= | 0.220 | nd2 1.6610 | v2 20.53 |
| R4 | 7.148 | d4= | 0.343 |  |  |
| R5 | 11.576 | d5= | 0.373 | nd3 1.6610 | v3 20.53 |
| R6 | 56.894 | d6= | 0.227 |  |  |
| R7 | −4.913 | d7= | 0.403 | nd4 1.5444 | v4 55.82 |
| R8 | −2.586 | d8= | 1.630 |  |  |
| R9 | 3.628 | d9= | 0.562 | nd5 1.5236 | v5 55.69 |
| R10 | 1.561 | d10= | 0.492 |  |  |
| R11 | ∞ | d11= | 0.276 | ndg 1.5168 | vg 64.17 |
| R12 | ∞ | d12= | 0.468 |  |  |

Table 10 shows aspherical data of respective lenses in the camera optical lens 30 according to Embodiment 3 of the present disclosure.

TABLE 10

| | Conic coefficient | Aspherical coefficients | | | | |
|---|---|---|---|---|---|---|
| | k | A4 | A6 | A8 | A10 | A12 |
| R1 | −8.6736E−02 | −6.4615E−03 | −1.7391E−03 | −5.8323E−03 | 1.6394E−03 | −1.9886E−03 |
| R2 | −9.0000E+01 | −5.9618E−02 | 2.3203E−02 | 4.1850E−03 | −3.3048E−02 | 3.0687E−02 |
| R3 | 3.3986E+01 | −1.5003E−01 | 3.2625E−01 | −2.8000E−01 | 1.3211E−01 | −1.6236E−02 |
| R4 | 3.2100E+01 | −1.6914E−01 | 3.5521E−01 | −3.2058E−01 | 1.7689E−01 | −5.3613E−02 |
| R5 | 5.3231E+01 | −1.5814E−01 | 6.0234E−02 | 8.7605E−04 | −7.1504E−02 | 6.4490E−02 |
| R6 | −9.4359E+01 | −1.2292E−01 | 5.5192E−02 | −2.3583E−02 | 5.2946E−03 | 2.9501E−03 |
| R7 | −6.3423E+01 | −1.4792E−01 | 1.4811E−01 | −1.3529E−01 | I.6468E−01 | −1.1580E−01 |
| R8 | −3.0754E−01 | −4.1032E−02 | 4.4880E−02 | −2.7411E−02 | 2.9468E−02 | −9.4544E−03 |
| R9 | −1.5192E−01 | −1.7175E−01 | 5.7012E−02 | −1.5546E−02 | 3.3753E−03 | −5.0121E−04 |
| R10 | −4.8283E+00 | −7.6158E−02 | 2.7394E−02 | −7.5007E−03 | 1.3833E−03 | −1.6261E−04 |

| | Conic coefficient | Aspherical coefficients | | |
|---|---|---|---|---|
| | k | A14 | A16 | A18 |
| R1 | −8.6736E−02 | 1.1601E−04 | −9.8909E−06 | 0.0000E+00 |
| R2 | −9.0000E+01 | −1.2955E−02 | 2.0557E−03 | 0.0000E+00 |
| R3 | 3.3986E+01 | −9.4120E−03 | 2.8025E−03 | 0.0000E+00 |
| R4 | 3.2100E+01 | 8.0953E−03 | −4.7638E−04 | 0.0000E+00 |
| R5 | 5.3231E+01 | −2.6342E−02 | 5.3537E−03 | 0.0000E+00 |
| R6 | −9.4359E+01 | −1.0340E−02 | 7.7593E−03 | −1.8900E−03 |
| R7 | −6.3423E+01 | 3.9675E−02 | −5.4323E−03 | 0.0000E+00 |
| R8 | −3.0754E−01 | −1.9566E−04 | 2.8913E−04 | 0.0000E+00 |
| R9 | −1.5192E−01 | 4.5452E−05 | −1.8946E−06 | 0.0000E+00 |
| R10 | −4.8283E+00 | 1.1159E−05 | −3.7916E−07 | 4.1504E−09 |

Table 11 and Table 12 show design data of inflexion points and arrest points of respective lens in the camera optical lens 30.

TABLE 11

| | Number of inflexion points | Inflexion point position 1 | Inflexion point position 2 | Inflexion point position 3 |
|---|---|---|---|---|
| P1R1 | 1 | 1.045 | / | / |
| P1R2 | 1 | 0.295 | / | / |
| P2R1 | 1 | 0.635 | / | / |
| P2R2 | 0 | / | / | / |
| P3R1 | 1 | 0.225 | / | / |
| P3R2 | 1 | 0.115 | / | / |
| P4R1 | 2 | 0.835 | 1.315 | / |
| P4R2 | 2 | 0.925 | 1.465 | / |
| P5R1 | 3 | 0.395 | 1.905 | 2.435 |
| P5R2 | 2 | 0.685 | 2.915 | / |

TABLE 12

| | Number of arrest points | Arrest point position 1 | Arrest point position 2 |
|---|---|---|---|
| P1R1 | 0 | / | / |
| P1R2 | 1 | 0.525 | / |
| P2R1 | 1 | 0.945 | / |
| P2R2 | 0 | / | / |
| P3R1 | 1 | 0.395 | / |
| P3R2 | 1 | 0.195 | / |
| P4R1 | 2 | 1.235 | 1.365 |
| P4R2 | 2 | 1.335 | 1.565 |
| P5R1 | 1 | 0.725 | / |
| P5R2 | 1 | 1.585 | / |

Table 13 below further lists various values of Embodiment 3 and values corresponding to parameters which are specified in the above conditions. Obviously, the camera optical lens of this embodiment satisfies the various conditions.

Figure 10:
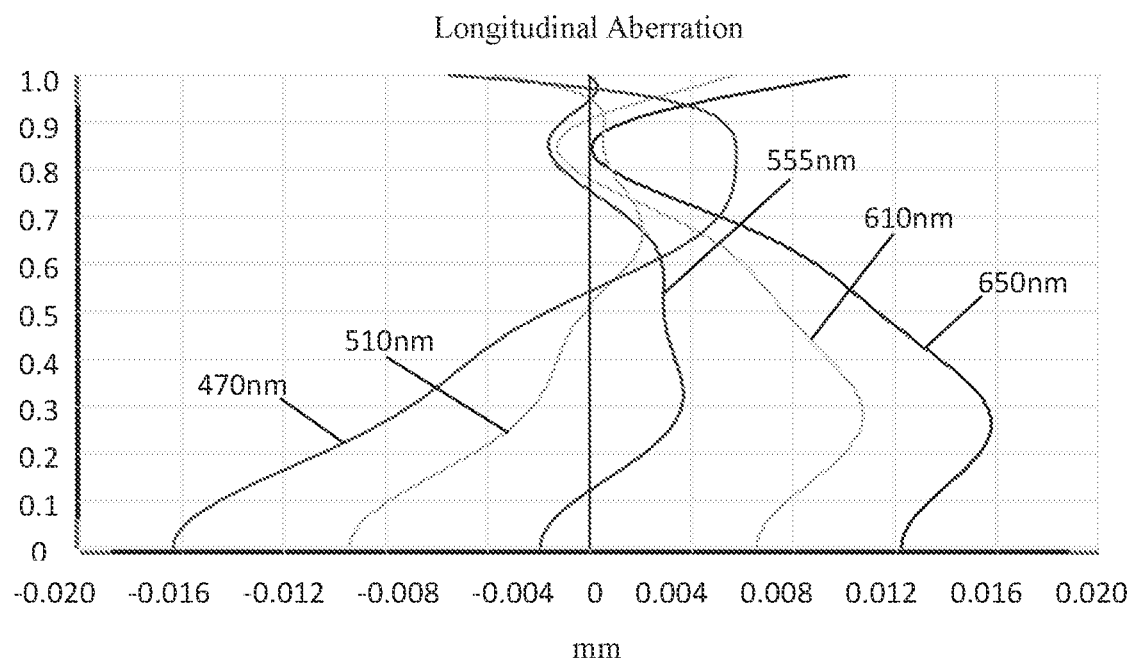
FIG. 10 is a schematic diagram of a longitudinal aberration of the camera optical lens shown in FIG. 9.
Figure 11:
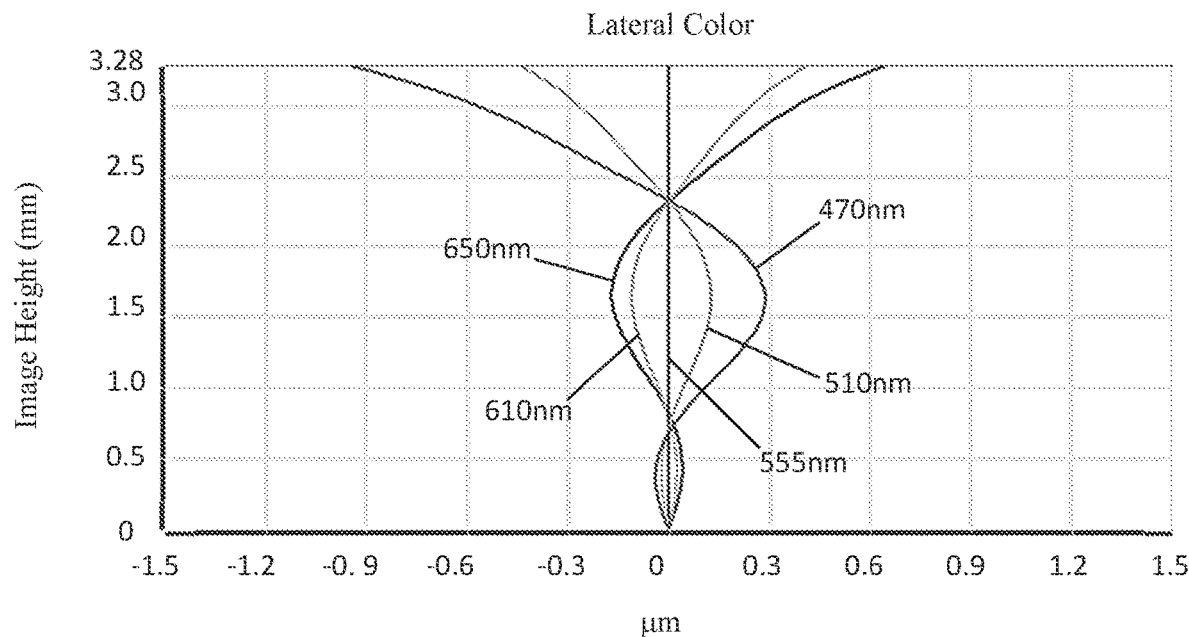
FIG. 11 is a schematic diagram of a lateral color of the camera optical lens shown in FIG. 9.
Figure 12:
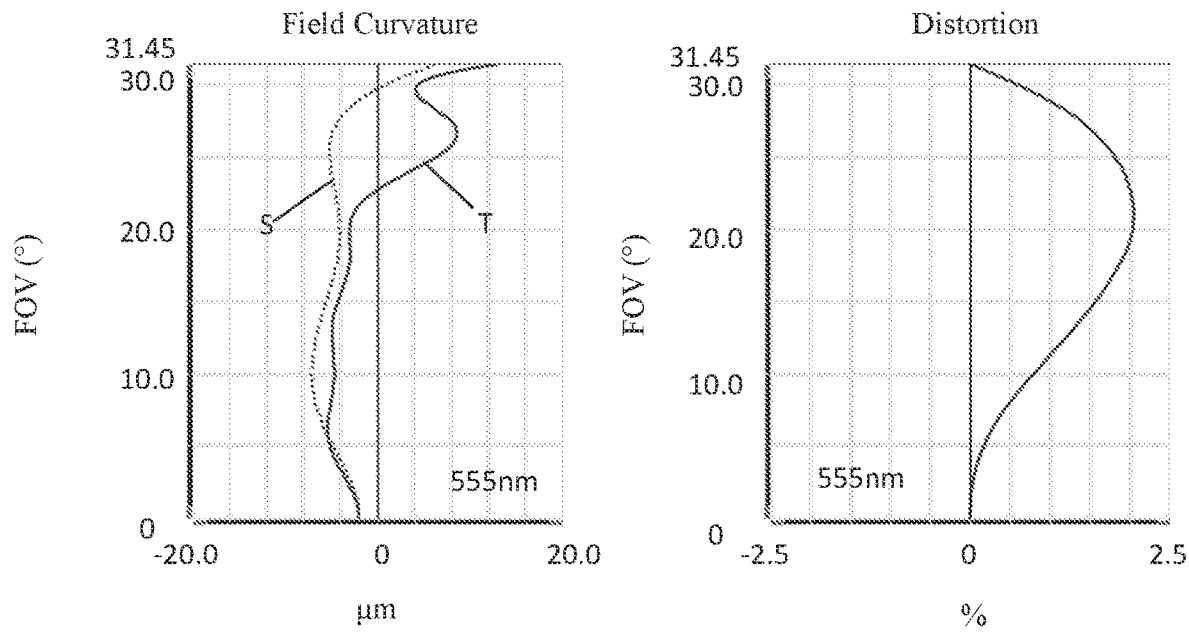
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30. FIG. 12 illustrates a field curvature and a distortion of light with a wavelength of 555 nm after passing the camera optical lens 30, in which a field curvature S is a field curvature in a sagittal direction and T is a field curvature in a tangential direction.

In this embodiment, the entrance pupil diameter ENPD of the camera optical lens 30 is 2.436 mm. The image height IH is 3.28 mm. The field of view (FOV) along a diagonal direction is 62.90°. Thus, the camera optical lens 30 can satisfy requirements of ultra-thin, large-aperture, long-focal-length design while having on-axis and off-axis aberrations sufficiently corrected, thereby leading to better optical characteristics.

Table 13 below further lists various values of Embodiment 1, Embodiment 2, and Embodiment 3 and values corresponding to parameters which are specified in the above conditions.

TABLE 13

| Parameters and Conditions | Embodiment 1 | Embodiment 2 | Embodiment 3 |
|---|---|---|---|
| f1/f | 0.64 | 0.52 | 0.78 |
| f2/f | −0.89 | −0.71 | −1.19 |
| d8/d9 | 2.33 | 1.51 | 2.90 |
| R3/R4 | −1.13 | −0.63 | −1.50 |
| R7/R8 | 1.54 | 1.27 | 1.90 |
| f | 5.360 | 5.360 | 5.360 |
| f1 | 3.418 | 2.787 | 4.181 |
| f2 | −4.779 | −3.805 | −6.392 |
| f3 | 16.735 | 16.931 | 21.724 |
| f4 | 10.759 | 13.917 | 9.418 |
| f5 | −5.128 | −4.739 | −5.757 |
| FNO | 2.20 | 2.20 | 2.20 |
| TTL | 6.008 | 6.001 | 6.000 |
| FOV | 62.92 | 62.70 | 62.90 |
| IH | 3.28 | 3.28 | 3.28 |

The above are only the embodiments of the present disclosure. It should be pointed out here that for those of ordinary skill in the art, improvements can be made without departing from the inventive concept of the present disclosure, but these all belong to the scope of the present disclosure.

What is claimed is:

1. A camera optical lens, comprising, from an object side to an image side:
   a first lens having a positive refractive power;
   a second lens having a negative refractive power;
   a third lens having a positive refractive power;
   a fourth lens having a positive refractive power; and
   a fifth lens having a negative refractive power,
   wherein the camera optical lens satisfies:

$0.50 \leq f1/f \leq 0.80$;

$-1.20 \leq f2/f \leq -0.70$;

$-1.50 \leq d8/d9 \leq 3.00$;

$1.20 \leq R7/R8 \leq 2.00$;

$1.56 \leq f3/f \leq 6.08$;

$-3.02 \leq (R5+R6)/(R5-R6) \leq -0.48$; and $0.03 \leq d5/TTL \leq 0.10$, where f denotes a focal length of the camera optical lens, f1 denotes a focal length of the first lens, f2 denotes a focal length of the second lens, f3 denotes a focal length of the third lens, d5 denotes an on-axis thickness of the third lens, d8 denotes an on-axis distance from an image-side surface of the fourth lens to an object-side surface of the fifth lens, d9 denotes an on-axis thickness of the fifth lens, R3 denotes a curvature radius of an object-side surface of the second lens, R4 denotes a curvature radius of an image-side surface of the second lens, R5 denotes a curvature radius of an object-side surface of the third lens, R6 denotes a curvature radius of an image-side surface of the third lens, R7 denotes a curvature radius of an object-side surface of the fourth lens, R8 denotes a curvature radius of the image-side surface of the fourth lens, and TTL denotes a total optical length from an object-side surface of the first lens to an image plane of the camera optical lens along an optic axis.

2. The camera optical lens as described in claim 1, wherein the camera optical lens further satisfies: $1.50 \leq d4/d6 \leq 3.00$, where d4 denotes an on-axis distance from the image-side surface of the second lens to an object-side surface of the third lens, and d6 denotes an on-axis distance from an image-side surface of the third lens to the object-side surface of the fourth lens.

3. The camera optical lens as described in claim 1, wherein the camera optical lens further satisfies:

$-2.55 \leq (R1+R2)/(R1-R2) \leq -0.24$; and $0.06 \leq d1/TTL \leq 0.29$, where R1 denotes a curvature radius of an object-side surface of the first lens, R2 denotes a curvature radius of an image-side surface of the first lens, d1 denotes an on-axis thickness of the first lens.

4. The camera optical lens as described in claim 1, wherein the camera optical lens further satisfies:

$-0.46 \leq (R3+R4)/(R3-R4) \leq 0.30$; and $0.02 \leq d3/TTL \leq 0.09$, where d3 denotes an on-axis thickness of the second lens.

5. The camera optical lens as described in claim 1, wherein the camera optical lens further satisfies:

$0.88 \leq f4/f \leq 3.89$;

$1.61 \leq (R7+R8)/(R7-R8) \leq 12.61$; and $0.03 \leq d7/TTL \leq 0.14$, where f4 denotes a focal length of the fourth lens, d7 denotes an on-axis thickness of the fourth lens.

6. The camera optical lens as described in claim 1, wherein the camera optical lens further satisfies:

$-2.15 \leq f5/f \leq -0.59$;

$0.69 \leq (R9+R10)/(R9-R10) \leq 3.77$; and $0.04 \leq d9/TTL \leq 0.17$, where f5 denotes a focal length of the fifth lens, R9 denotes a curvature radius of the object-side surface of the fifth lens, R10 denotes a curvature radius of an image-side surface of the fifth lens.

7. The camera optical lens as described in claim 1, wherein the camera optical lens further satisfies: $FNO \leq 2.20$, where FNO denotes an F number of the camera optical lens.

8. The camera optical lens as described in claim 1, wherein the camera optical lens further satisfies: f/IH≥1.63, where IH denotes an image height of the camera optical lens.

9. The camera optical lens as described in claim 1, wherein the camera optical lens further satisfies: TTL/IH≤1.85, where IH denotes an image height of the camera optical lens.

* * * * *